July 10, 1928.
A. OLSON
1,676,916
CONVEYER FOR CORN HARVESTERS
Filed July 27, 1925
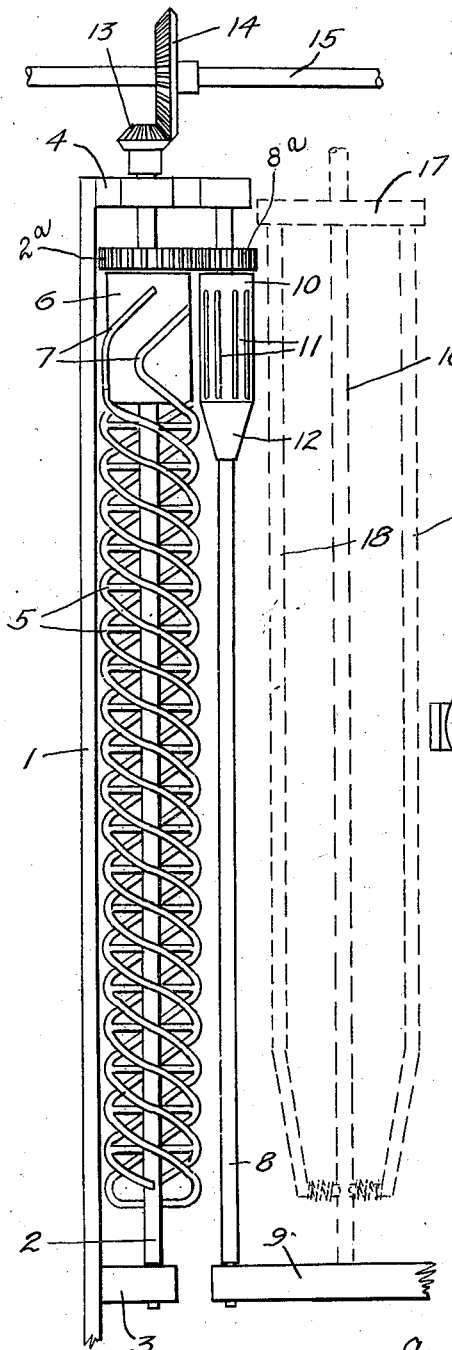
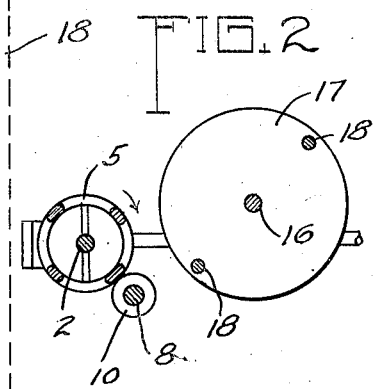
INVENTOR
BY Anders Olson.
Walter N. Haskell.
his ATTORNEY.

Patented July 10, 1928.

1,676,916

UNITED STATES PATENT OFFICE.

ANDERS OLSON, OF GALESBURG, ILLINOIS, ASSIGNOR OF ONE-HALF TO SWAN HANSON, OF GALESBURG, ILLINOIS.

CONVEYER FOR CORN HARVESTERS.

Application filed July 27, 1925. Serial No. 46,286.

My invention has reference to a conveyer for corn harvesters, and aims to improve that type of such machines which is disclosed in Letters Patent of the United States No. 1,336,578, issued to myself and Swan Hanson April 13, 1920. In the operation of said machines the corn-stalks are guided into the machine by means of a spiral feed mechanism, in the passage through which the ears of corn are removed from the stalks. The feed devices are supported in an inclined position, with the lowest part at the front of the machine, and as the stalks are moved rearwardly there is a tendency of the same becoming clogged in the machinery at the upper end of such feed devices. On this account it is necessary to frequently clean out the clogged material, and the machine is rendered more or less inoperative.

The chief purpose of the present invention is to improve the feed devices, so as to overcome the difficulties above mentioned.

In the construction and operation of the machine it is usual to have two sets of feed devices, in order to include two rows of corn in the operation, but in the drawings in the present application only one set of such devices is shown, and in a fragmentary manner, for the purpose of illustrating the embodiment therewith of the improvements. In said drawings:—

Fig. 1 is a plan view of a stalk conveying mechanism, with the invention applied thereto.

Fig. 2 is a diagrammatical view showing the relative positions of the conveyer, snapping bar, and snapping reel.

The reference number 1 indicates a portion of the frame of the machine, in which is rotatably mounted a shaft 2, the lower end of said shaft being supported in an extension 3 of the frame, and the upper end journalled in a bearing on a part 4 of said frame.

Supported from the shaft 2 is a plurality of spiral rods 5, spaced apart a sufficient distance so that a corn stalk can be readily received between the same, and in the operation of the machine a rotary movement is imparted to said spirals, causing a movement of any stalks entering the same toward the upper end thereof. At the upper end of the spiral conveyer is a cylindrical head 6, secured to the shaft 2 so as to rotate therewith, and the rods 5 are carried upwardly upon said head in bent end portions 7.

At one side of the spiral conveyer is a snapping bar 8, rotatably supported at its upper end in the frame 4 and at its lower end in a portion 9 of the main frame. To the upper end of the bar 8 is fixed a roller 10, provided with longitudinal grooves 11, and ending downwardly in a tapered portion 12.

The shaft 2 is operated by means of a bevel gear pinion 13 on the upper end of said shaft, in mesh with a bevel gear wheel 14 on a drive shaft 15, to which movement is imparted as shown in said former patent, or other suitable manner. The movement of the shaft 2 is imparted to the bar 8 to cause a rotation thereof in a direction opposite to that of the shaft 2 by means of a gear wheel $2^a$ on the shaft 2 in mesh with a gear wheel $8^a$ on the bar 8, the relative sizes of said wheels being such as to cause the peripheries of the head 6 and roller 10 to travel at the same rate of speed. In the operation of the machine the movement of said head and roller is towards each other, and in a direction tending to draw the stalks downwardly between the same. This tendency is aided by the bent ends of the spirals on the head 6 and the grooves in the roller 10. The tapered end of said roller assists in directing the stalks into the space between the roller and head. By means of this mechanism the upper end of the conveyer mechanism is kept freed from the stalks at all times, and objectionable jamming or clogging thereof in the machinery is prevented.

There is also indicated in the drawings a snapping reel mechanism, which is closely associated with the conveyer devices, but is not directly involved in the present improvement. This mechanism comprises a shaft 16, rotatably mounted, having a circular head 17 and snapping arms 18 capable of movement in proximity to the bar 8, for the purpose of breaking off the ears of corn which hang over said bar. The proper relations of the shaft 2 and spirals thereon, the bar 8, and the snapping mechanism is more clearly shown in Fig. 2 of the drawings.

What I claim, and desire to secure by Letters Patent, is:

In a device of the class described, in combination with a spiral conveyer and snapping bar rotatably mounted in parallel relation therewith, a cylindrical head at the upper end of said conveyer upon which the spirals are extended in a reverse direction, a grooved roller on the upper end of said snapping bar of relatively smaller size than said head, and in proximity thereto, and means for operating said head and roller in a direction to draw material downwardly between the same.

In testimony whereof I affix my signature.

ANDERS OLSON.